United States Patent Office 3,365,454
Patented Jan. 23, 1968

3,365,454
1,4 - DIFORMYL - 2,3,5,6 - TETRAHYDROXYPIPER-AZINE AND DERIVATIVES AND PREPARATION THEREOF
Alan Norman Ferguson, Irvine, and Godfrey Fort, Ardrossan, Scotland, assignors to Imperial Chemical Industries Limited, London, England, a corporation of Great Britain
No Drawing. Filed July 16, 1965, Ser. No. 472,717
Claims priority, application Great Britain, Aug. 6, 1964, 32,124/64
8 Claims. (Cl. 260—268)

ABSTRACT OF THE DISCLOSURE

The compound 1,4 - diformyl - 2,3,5,6 - tetrahydroxypiperazine and its derivatives. The compound is prepared by reacting formamide with glyoxal under alkaline reaction conditions.

---

This invention relates to a new compound 1,4-diformyl-2,3,5,6-tetrahydroxypiperazine and its derivatives.

The new compound is prepared by reacting formamide with glyoxal in the presence of an alkaline catalyst. The reaction may be represented:

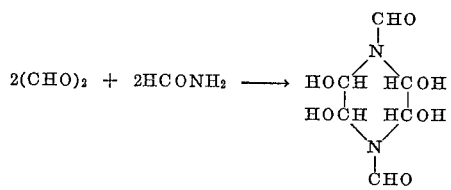

By employing strongly alkaline catalysts such as, for example, sodium carbonate, in large concentration, rapid reaction can be effected but if the reaction is too rapid, it is difficult to control and excessive heat evolution is likely to cause thickening and darkening of the reaction mixture. It is preferable, therefore, to employ a milder alkaline catalyst such as, for example, sodium bicarbonate and to carry out the reaction slowly at about room temperature. The reaction is accompanied by side reactions which are believed to lead to non-cyclic products including 1,2-dihydroxy-1,2-diformamidoethane.

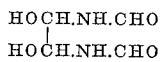

Glyoxal is conveniently used in the form of its monohydrate which is usually soluble in cold formamide. However, concentrated solutions in formamide can only be prepared from strongly acid samples of glyoxal monohydrate if the acidity is neutralised at least partially by adding a neutralising agent such as sodium bicarbonate. A preferred procedure is to dissolve glyoxal monohydrate in cold formamide adding if necessary a suitable neutralising agent in an amount sufficient to facilitate dissolution of the glyoxal, but insufficient to increase the alkalinity of the system to an extent which will initiate the condensation reaction between glyoxal and formamide. When all the glyoxal has dissolved the condensation reaction may be initiated by adding the alkaline catalyst.

The product crystallises from the reaction mixture accompanied by other crystalline substances which include the aforementioned non-cyclic products. Treatment of the crude product with hot water, preferably under acid conditions, gives the purified compound. The effectiveness of this method of purification is attributed to the lower solubility and higher stability of 1,4-diformyl-2,3,5,6-tetrahydroxypiperazine compared with the other products. Under carefully controlled conditions it is possible to obtain 1,4-diformyl-2,3,5,6-tetrahydroxypiperazine as a first crop and 1,2-dihydroxy-1,2-diformamidoethane as a second crop.

Because of its four hydroxyl groups, 1,4-diformyl-2,3,5,6-tetrahydroxypiperazine is an extremely reactive compound and is, therefore, a very valuable intermediate for the preparation of organic compounds. For example, the hydroxyl groups can be readily esterified or etherified by many of the usual esterifying or etherifying agents. Readily prepared esters include, for example, 1,4-diformyl-2,3,5,6-tetra-acetoxypiperazine, 1,4-diformyl-2,3,5,6-tetrabenzoxypiperazine, 1,4-diformyl-2,3,5,6-tetrachloropiperazine and diformyl tetranitratopiperazine. The tetranitrate ester, which is a valuable energetic constituent of explosives, may be obtained by direct nitration, a convenient nitrating agent being a mixture of acetic anhydride and nitric acid. Alternatively, it may be prepared by treating the tetrachloro derivative with a nitrating agent such as, for example, silver nitrate. Readily prepared ethers include, for example, 1,4-diformyl-2,3,5,6-tetramethoxypiperazine and 1,4-diformyl-2,3,5,6-tetra-ethoxypiperazine.

The invention is further illustrated by the following examples in which all parts and percentages are by weight.

Example 1

76 parts of a weakly acid sample of glyoxal monohydrate were stirred mechanically with 90 parts of formamide at room temperature until dissolved. 6 parts sodium bicarbonate were added and stirring continued until only a trace of solid remained. The mixture was cooled as necessary to prevent the temperature rising about 25° C. approximately during mixing or during the subsequent reaction period. After standing at room temperature for 3 days with occasional stirring most of the reaction mixture had crystallised. 79 parts of methanol were added to facilitate filtration and the crystalline product filtered off. Washing with cold methanol and drying at room temperature gave 84.2 parts of crude crystalline product which were purified by adding to 620 parts of boiling 0.36% hydrochloric acid, heating at the boiling point with stirring for 5 minutes and cooling rapidly. After standing for 2 hours at 0° C. the crystalline solid was filtered off. The yield of purified 1,4-diformyl-2,3,5,6-tetrahydroxypiperazine was 28.2 parts or 27.4% of the theoretical yield calculated on glyoxal. The product was a white, crystalline powder which blackened at 190° C. approximately. The product was found to contain C, 34.2%; H, 5.2%; N, 13.6%. 1,4-diformyl-2,3,5,6-tetrahydroxypiperazine, $C_6H_{10}N_2O_6$ requires C, 34.95%; H, 4.85%; N, 13.6%. The infra-red spectrum of a dispersion in a high-boiling petroleum fraction showed strong absorption at 3.0, 3.1, 6.0, 9.35, 9.5 and 10.7$\mu$ and weaker absorption at 7.0, 7.2, 7.6, 7.8, 8.0, 8.4, 9.9 and 12.6$\mu$.

After filtering off the crystals of purified diformyl-tetrahydroxypiperazine the aqueous mother liquor was kept at 0° C. for 1 day and 2.2 parts of crystalline crop were obtained which did not melt sharply but blackened at 135–140° C. The crystals were found to contain C, 32.2%; H, 5.8%; N, 18.0%. Dihydroxy-diformamidoethane ($C_4H_8N_2O_4$) requires C, 32.4%; H, 5.4%; N, 18.9%. The infra-red spectrum of dispersion in a high-boiling petroleum fraction showed strong absorption at 3.0, 3.2, 6.05, 6.4, 7.1 and 9.3$\mu$ and weaker absorption at 7.5, 7.85, 8.0, 8.2, 9.6, 9.95 and 12.1$\mu$. The absorption band at 6.4$\mu$ is known to be characteristic of acylic secondary amides.

Example 2

7.6 parts glyoxal monohydrate were dissolved in 9 parts formamide at 30–40° C., cooled to 20° C. and powdered sodium carbonate was added to the mixture until a test drop indicated pH 8. After three days 2.55 parts of fine crystalline precipitate which had formed were filtered off and washed with methanol. This crude product decomposed at 140–150° C. without melting. The infra-red spectrum of this crude product had an absorption band at 6.4μ.

The crude product was recrystallised from boiling water and the recrystallised material had an infra-red spectrum from which the absorption band at 6.4μ was absent. The purified material was found to contain C, 35.2%; H, 5.55% and N, 13.7%. 1,4-diformyl-2,3,5,6-tetrahydroxypiperazine, $C_6H_{10}N_2O_6$, requires C, 34.95%; H, 4.85% and N, 13.6%.

Example 3

1 part of purified 1,4-diformyl-2,3,5,6-tetrahydroxypiperazine, prepared as in Example 1, was suspended in a mixture of 30 parts glacial acetic acid and 30 parts acetic anhydride and 1 part concentrated sulphuric acid was added with sufficient cooling to prevent the temperature rising above about 30° C. After 20 hours at room temperature the original fine crystals of starting material had been replaced by coarser crystals of the acetyl substituted derivative. The reaction mixture was diluted with ice and water and the acetate filtered off and washed with water. 1.47 parts of acetate were obtained and were purified by recrystallisation from hot acetonitrile. The pure product melted at 262–263° C. It was found to contain C, 45.0%; H, 4.9%; N, 7.7%. 1,4-diformyl-2,3,5,6-tetra-acetoxypiperazine ($C_{14}H_{18}N_2O_{10}$) requires C, 44.9%; H, 4.82%; N, 7.49%.

The infra-red spectrum of the purified product had carbonyl bands at 5.7 and 5.9μ, the former band being at the wavelength expected for an acetyl ester. There was no peak in the 3μ region showing that hydroxyl groups were absent.

Example 4

6.18 parts of 1,4 - diformyl - 2,3,5,6-tetrahydroxypiperazine, prepared as in Example 1, were suspended in 98 parts of thionyl chloride and 0.5 parts of pyridine were added. The mixture was heated under reflux for 3 hours. After cooling, the greyish solid product was filtered off, added to water at 0° C., filtered, washed thoroughly with ice-cold water and dried in a vacuum desiccator over calcium chloride to yield 6.4 parts of crude 1,4-diformyl-2,3,5,6-tetrachloropiperazine which was purified by recrystallising twice from acetonitrile. The purified product melted with decomposition at 185–189° C. and was found to contain C, 25.7%; H, 2.24%; N, 9.8%; Cl, 50.0%. Diformyl - tetrachloropiperazine, $C_6H_6N_2O_2Cl_4$, requires C, 25.7%; H, 2.14%; N, 10.0%; Cl, 50.7%. The infra-red spectrum showed strong absorption at 5.9, 7.6, 8.0, 8.3, 10.6 and 13.85μ and weaker absorption at 7.0, 7.1, 7.9, 8.15, 9.8, 12.2 and 13.3μ.

Example 5

2.72 parts of silver nitrate dissolved in 25 parts acetonitrile were added dropwise at 20° C. during 20 minutes to a stirred suspension of 1.12 parts of the 1,4-diformyl-2,3,5,6-tetrachloropiperazine, prepared as in Example 4, in 8 parts of acetonitrile. The reaction mixture was shaded from bright light and stirring was continued for a further 45 minutes. Silver chloride was filtered off and washed with acetonitrile. The filtrate was evaporated under reduced pressure at 30° to give a solid product which still contained some silver chloride. The solid product was extracted three times with cold acetone (total 24 parts) and the filtered extract was evaporated under reduced pressure at 30° C. to give a yellow solid which was further purified by washing with water at 0° C. followed by ether at 20° C. After drying in vacuo at 20° C., 1.17 parts of crude 1,4-diformyl-2,3,5,6-tetranitratopiperazine were obtained as a white crystalline solid melting at 152–153° with effervescence.

For further purification the crude product was dissolved in 6.3 parts of cold acetone. The solution was filtered to remove a small amount of silver chloride and then poured with stirring into 40 parts of cold water. The precipitate was filtered off, washed with cold water and dried in a vacuum desiccator over phosphorus pentoxide. The yield of purified 1,4-diformyl-2,3,5,6-tetranitratopiperazine was 0.975 parts (63% of theory) melting at 152–153° C. with effervescence. The product was found to contain C, 19.3%; H, 2.75%; N, 21.55% and had a molecular weight of 415 (by the ebullioscopic method in acetone). Diformyl-tetranitratopiperazine ($C_6H_6O_{14}N_6$) requires C, 18.65%; H, 1.56%; N, 21.75%; M.W. 386. Recrystallisation from boiling ethanol also gave tetranitrate melting at 152–153°.

The infra-red spectrum of the 1,4-diformyl-2,3,5,6-tetranitratopiperazine prepared showed strong absorption at 5.8, 6.0, 6.1, 7.2, 7.7, 7.8, 7.9, 8.0, 8.2, 9.95, 10.8 and 11.8–12.3μ (broad band) and weaker absorption at 7.1, 9.9, 10.3, 13.5, 14.0 and 14.45μ.

In an impact sensitivity test, samples of the purified product placed on a mild steel anvil exploded when a ½ kg. mild steel hammer was dropped on to it from a height of 30 cm. but did not explode when the height was 20 cm.

Example 6

7.01 parts of purified 1,4-diformyl-2,3,5,6-tetrachloropiperazine prepared as in Example 4 and 39.5 parts of barium carbonate were added to 60 parts of absolute ethanol and the mixture heated under reflux with efficient stirring for half an hour. The resulting slurry was filtered hot and the solid portion washed with 16 parts of hot ethanol. The combined filtrates were evaporated under reduced pressure at 30–40° C. to give a sticky, white solid which was washed with 12 parts of cold water and dried to give 3.90 parts of crystalline solid melting at 104–108° C. Recrystallisation from hot ligroin containing a little benzene and then from hot carbon tetrachloride gave purified 1,4-diformyl-2,3,5,6-tetra-ethoxypiperazine melting at 114.5–115.5° C. The purified product was found to contain C, 53.05%; H, 8.04%; N, 8.62%; $OC_2H_5$, 57.8% and its molecular weight was 285 by the ebullioscopic method in acetone. 1,4-diformyl-2,3,5,6-tetra-ethoxypiperazine ($C_{14}H_{26}O_6N_2$) requires C, 52.8%; H, 8.18%; N, 8.80%; $OC_2H_5$, 56.6% and molecular weight 318.

Example 7

7.0 parts of crude, 1,4-diformyl-2,3,5,6-tetrachloropiperazine prepared as in Example 4 were mixed with 39.5 parts of barium carbonate and 79 parts of absolute methanol were added to the mixture. The resulting slurry was heated at 40° C. for 3 hours with stirring. The barium salts were then filtered off and the methanol solution evaporated. The solid residue was extracted with 50 parts of hot chloroform and the extract evaporated to give 4.45 parts of sticky crystals which were washed with a little cold water and dried in a desiccator to give 3.3 parts of a crude crystalline solid. This solid was purified by recrystallisation from a hot mixture of methanol and benzene. The purified product melted at 196–197° and was found to contain C, 45.5%; H, 7.16%; N, 11.4%; $OCH_3$, 46.9%. 1,4 - diformyl - 2,3,5,6 - tetramethoxypiperazine ($C_{10}H_{18}N_2O_6$) requires C, 45.8%; H, 6.87%; N, 10.7%; $OCH_3$, 47.3%.

Example 8

1,4 - diformyl - 2,3,5,6 - tetrahydroxypiperazine (2.06 parts) was added to an ice-cold mixture of benzoyl chloride (8.5 parts) and dry pyridine (19.6 parts). The mixture was allowed to stand at room temperature for 3 days and the solid portion was filtered off and washed in turn with water, dilute hydrochloric acid, dilute sodium bicarbonate and again with water. The crystalline product (5.47 parts) was sparingly soluble in most organic solvents including acetone, acetonitrile and glacial acetic acid. This crude product was purified by recrystallisation from hot dimethyl formamide, and before drying the crystals were washed in turn with dimethyl formamide, water and ethanol. The purified benzoate (3.18 parts) melted with decomposition at 275° C. with some darkening above 250° C. and was found to contain C, 64.3%; H, 4.0%; N, 4.6%. 1,4-diformyl-tetrabenzoxypiperazine ($C_{34}H_{26}N_2O_{10}$) requires C, 65.6%; H, 4.2%; N, 4.5%.

*Example 9*

10.0 parts of 1,4-diformyl-2,3,5,6-tetrahydroxypiperazine prepared by the method of Example 1 were nitrated for 1 hour at 0° C. in a mixture of 376 parts of 99–100% nitric acid and 81 parts of acetic anhydride. The nitrated product remained undissolved and was filtered off, washed with water at 0° C., then with 1% sodium bicarbonate solution and finally again with water. After drying in a desiccator the yield of crude 1,4-diformyl-2,3,5,6-tetranitratopiperazine was 14.8 parts. This crude product was dissolved in cold acetone and reprecipitated by addition of water to give a purified product which was identified by its infra-red spectrum (which was similar to that of the product of Example 5) as 1,4-diformyl-2,3,5,6-tetranitratopiperazine.

What we claim is:

1. A member of the group consisting of 1,4-diformyl 2,3,5,6-tetrahydroxypiperazine and the tetrachloro and tetranitrato derivatives thereof.
2. 1,4-diformyl-2,3,5,6-tetrachloropiperazine.
3. 1,4-diformyl-2,3,5,6-tetranitratopiperazine.
4. A process for the preparation of 1,4-diformyl-2,3,5,6-tetrahydroxypiperazine which comprises reacting formamide with glyoxal under alkaline reaction conditions.
5. A process as claimed in claim 4 wherein an alkaline catalyst is employed, said catalyst being selected from the group consisting of sodium carbonate and sodium bicarbonate.
6. A process as claimed in claim 4 wherein the reaction is carried out at room temperature.
7. A process as claimed in claim 4 wherein the product is purified by recrystallisation from water.
8. The process which comprises esterifying 1,4-diformyl-2,3,5,6-tetrahydroxypiperazine with a chlorinating agent.

References Cited

Noller, Chemistry of Organic Compounds (1965), pp. 146–47.

HENRY R. JILES, *Primary Examiner.*